United States Patent Office 3,649,559
Patented Mar. 14, 1972

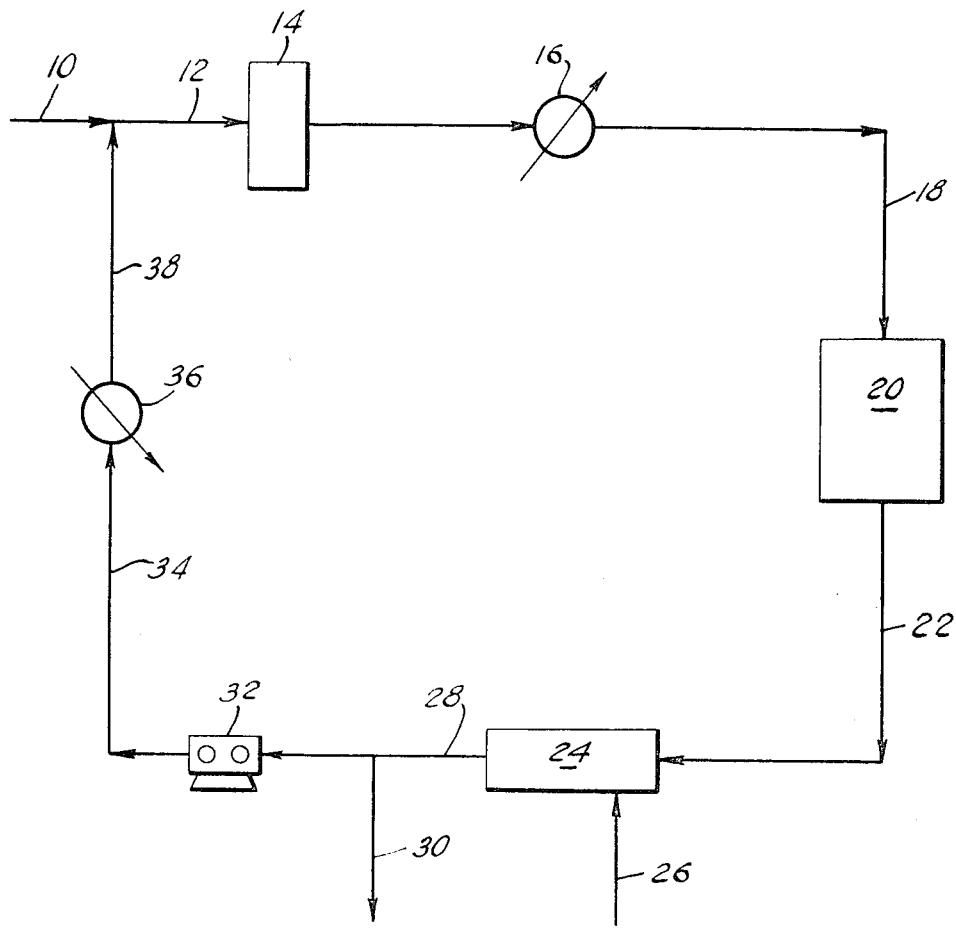

3,649,559
OXIDATIVE REGENERATING CRYSTALLINE ALUMINO-SILICATES WITH RECYCLE GAS TREATMENT
David E. Cooper, Greenville, S.C., assignor to Texaco Inc., New York, N.Y.
Filed June 27, 1967, Ser. No. 670,482
Int. Cl. B01j 11/04, 11/72
U.S. Cl. 252—416
2 Claims

ABSTRACT OF THE DISCLOSURE

A circulating oxidizing gas stream used to regenerate a bed of crystalline aluminosilicates is oxidized external to the bed to remove oxidizables from the effluent stream before it is recycled back to the bed. As an alternate to the oxidation, the oxidizables are removed from the effluent stream in an adsorption step.

BACKGROUND OF THE INVENTION

This invention relates to improvements in regenerating cystalline zeolitic molecular sieves. More particularly, it relates to improvements in the reactivation of crystalline molecular sieves by the controlled oxidative removal of carbonaceous materials on the surface of the sieves.

Zeolitic molecular sieves are a group of natural and synthetic aluminosilicates whose unique crystalline structure upon dehydration produces a network of crystallographic unit cells interconnected by pores having a precisely uniform diameter. These pores permit a sieving or screening action in the molecular size range thereby permitting the separation of molecules based on their average particle diameters. The terms, "molecular sieves," "crystalline zeolites" and "aluminosilicates," are used interchangeably herein but refer to the same adsorbent material.

Molecular sieves may be employed in a wide variety of processes involving the separation of fluid mixtures based on the average particle diameters of the components of the mixtures. A particularly striking utilization of these molecular sieves is in the separation of normal paraffins from mixturse of normal and non-normal hydrocarbons by contacting the mixture with a molecular sieve having a uniform pore opening of about 5 A. This molecular sieve, referred to as a type 5–A sieve, permits the passage of the normal paraffins through the pores and into the sieve cages where they are adsorbed while rejecting the non-normal hydrocarbons. In other processes, olefins may be preferentially adsorbed from refinery gas streams, carbon dioxide from a gaseous mixture comprising nitrogen, hydrogen, carbon monoxide, methane and ethane and hydrogen sulfide from a gaseous mixture comprising hydrogen, carbon dioxide, methane and ethane.

The adsorbed materials are removed from the molecular sieves in a desorption procedure which may involve a change in pressure or temperature, the use of a desorbent medium or a combination of all three. Although the desorption techniques are effective and permit the molecular sieves to be reused, it has been observed that the efficiency of the sieves gradually diminishes in proportion to the number of adsorption-desorption cycles due to the formation or deposition of a coating of a relatively high boiling carbonaceous material on the surface of the sieve particles. This carbonaceous deposit results in a reduction in the adsorption capacity of the molecular sieves requiring a periodic reactivation to remove this material.

Several regeneration techniques are known. U.S. 2,908,639 discloses a process of contacting the depleted molecular sieve with a solvent to reduce the carbonaceous deposit to a point where it may be safely burned off with an oxygen-containing gas. U.S. Pats. 3,069,362 and 3,069,363 disclose processes for regeneration of zeolitic aluminosilicates by preheating with an inert gas to reduce the carbon-hydrogen ratio followed by a controlled oxidation or burn-off wherein the oxygen and water vapor content of the regeneration gas are controlled within prescribed limits. In 3,069,362 the oxygen in the regeneration gas is limited to about 1 mole percent with the water partial pressure limited to 4 p.s.i.a. In this process a preheat zone precedes the burning zone and proceeds through the bed of crystalline zeolites at a rate faster than the burning zone. In 3,069,363 the oxygen content of the regeneration gas is 20 to 100 mole percent and the water vapor content of the gas is also restricted to 4 p.s.i.a. maximum. In this process the burning zone passes rapidly through the bed of adsorbent followed by a slower moving cooling zone.

The prior art recognizes that exposure to temperatures above about 1325° F. and exposure to appreciable quantities of water vapor at temperatures below about 1290° F. will produce substantial damage to the crystalline structure of the molecular sieves destroying their unique selective adsorption properties. Because of this possible permanent damage, the speed of burn-off during regeneration must be carefully controlled. Generally a maximum sieve bed temperature of about 950° F. will maintain the integrity of the crystalline structure. The speed of burning is primarily dependent upon the rate of heat generation from the combustion of the hydrocarbon deposit. The heat released from the regeneration, in turn, is dependent upon the amount and the type of hydrocarbon deposited on the molecular sieve, the rate at which the oxygen-containing gas is passed through the bed and the oxygen content of the feed gas.

It is also known that operating efficiencies involving compression costs and heat balance are achieved by recycling the gas stream during regeneration of the sieve although this requires some additional processing to adjust water content, temperature and oxygen concentration of the gas stream before it is reintroduced into the sieve bed.

In addition, the regeneration procedure is often improved considerably by preceding the burn-off with an inert gas stripping operation conducted at a 750–950° F. temperature wherein the hydrocarbon deposit is cracked producing significant quantities of $C_1$ and $C_2$ hydrocarbons which are removed from the molecular sieve by the stripping gas. This results in both a reduction of the hydrocarbon deposits on the sieve which must be removed during the burn-off and an increase in the carbon to hydrogen (C/H) ratio of the remaining deposit. The principal benefit obtained from burning a deposit with a higher C/H ratio is that less water is produced thereby reducing the load on a gas drier which is used when the regeneration gases are recycled. The drier maintains the water content of the gas at a safe level with respect to the stability of the molecular sieve structure.

When the oxidation of the carbonaceous deposit is conducted in such a manner that the burning wave slowly moves through the sieve bed preceded by an expanding heat storage zone, the need for a high temperature stripping step prior to the regeneration is minimized. The maximum sieve bed temperature occurs at the leading edge of the burning wave where the last of the oxygen in the regeneration gas is consumed. The expanding heat storage zone which precedes the burning wave is at a considerably higher temperature than either the top or the bottom of the sieve bed. For example, when the peak burning wave temperature is about 940° F. the bed temperatures in this heat storage zone will usually range between 750 to 940° F. The bed temperatures which occur in the heat storage zone are high enough that removal of much of the sieve deposit in the form of $C_1$ and $C_2$ hydrocarbons can be effected by this heat storage zone in much the same manner as the high temperature inert gas stripping step.

Since deposit loading on the molecular sieve prior to regeneration decreases with increasing distance from the inlet end of the sieve bed during the adsorption step, the gas flow during regeneration should be countercurrent to that during adsorption to maximize the deposit-removing effect of the heat storage zone. By initiating the burn-off at the end of the sieve bed with the lowest deposit loading, i.e., the outlet during adsorption, more of the total deposit will be exposed for a longer period to the high temperature of the heat storage zone.

Recycling the regeneration gas stream, although providing savings in operating costs, does create some additional processing problems. During burn-off the carbon in the carbonaceous deposit is oxidized predominantly according to the following reaction:

$$C + O_2 \rightarrow CO_2$$

However, significant quantities of CO may also be formed by the following reactions:

$$2C + O_2 \rightarrow 2CO$$

and $$CO_2 + C \rightarrow 2CO$$

Thus, in a situation where the regeneration carrier gas is recycled, any CO present in this gas stream will be oxidized exothermically within the molecular sieve bed as follows:

$$2CO + O_2 \rightarrow 2CO_2$$

This heat release within the bed is undesirable and necessitates a reduction in the reactivation rate to limit the sieve bed temperature to a safe level.

SUMMARY OF THE INVENTION

I have found that in the regeneration of molecular sieves, wherein the regeneration gas is recycled through the bed, improvements can be effected by oxidizing or removing oxidizable materials in the regeneration gas after it passes through the molecular sieve bed and prior to its being recycled back to the bed. This may be accomplished in any of several ways. Where the principal combustible or oxidizable material is CO, an afterburner may be effectively employed in the recycle system. Where an inert gas stripping step does not precede the activation step, combustibles in the recycle stream will comprise CO and low molecular weight hydrocarbons. In this situation, an afterburner will also effectively remove these combustibles from the recycle gas although the resultant water vapors will have to be removed by gas driers before the recycled gas is returned to the molecular sieve bed. As alternates to the afterburner the CO can be removed from the recycle gas by absorption with betanaphthol or cuprous chloride-ammonia solution and unoxidized hydrocarbons can be removed by passing the recycled gas stream through a bed of absorbent, such as silica gel or molecular sieves.

BRIEF DESCRIPTION OF THE DRAWING

The present invention will be more readily understood by reference to the accompanying drawing which is a schematic flow diagram of the process of the invention showing the regeneration of the molecular sieves and the use of an afterburner to remove combustibles from the regeneration gas.

DESCRIPTION OF THE PREFERRED EMBODIMENT

My invention may be understood from the following detailed description, taken with reference to the accompanying drawing which illustrates diagrammatically a preferred embodiment for practicing the method of my invention.

The drawing illustrates a system of regenerating molecular sieves with a recycling gas stream by the controlled oxidation of carbonaceous material deposited on the sieves. A make-up stream of an oxygen-containing gas flows through line 10 into line 12 where it is combined with the recycled regeneration gas stream. The combined gas streams pass through drier 14 where the water content of the gas is reduced to a level commensurate with the crystalline integrity of the molecular sieves. The mixture of gasses then pass into a heat exchanger or furnace 16 where they are heated to a temperature of approximately 800–900° F. during the initial portion of the regeneration until the burning wave is formed and then to a temperature of approximately 600 to 700° F. during the balance of the regeneration step. The gases, at the desired temperature, moisture content and oxygen content, pass through line 18 into the molecular sieve vessel 20. In this vessel the combustion of the carbonaceous deposit occurs in a burning wave which gradually moves through the bed. The maximum sieve bed temperature occurs at the leading edge of the burning wave where the last of the oxygen is consumed. By maintaining the oxygen content below approximately 20 mole percent, the leading edge of this burning wave moves slowly and is preceded through the bed by an expanding heat storage zone in which the bed temperatures are considerably higher than temperatures at the top and bottom of the bed yet lower than that of the burning wave. For example, when the peak burning wave temperature is approximately 940° F., the bed temperatures in this storage zone will usually range between 750 and 940° F. The effluent gases leaving sieve vessel 20 contain quantities of water vapor, $CO_2$, CO and in the event that a stripping step did not precede the regeneration, a quantity of unoxidized $C_1$ and $C_2$ hydrocarbons. These exit gases pass through line 22 and into afterburner chamber 24 which serves as an oxidation zone. An oxygen-containing gas, usually air, is introduced into the afterburner chamber through line 26. In this vessel the oxidizable materials in the effluent gases are oxidized to carbon dioxide and water vapor. After a residence time in the afterburner chamber of sufficiently long duration to complete the desired oxidation, the regeneration gases pass through line 28 where a quantity of the recycle gas is bled off through line 30. The remaining gases pass into compressor 32 which provides the driving force to circulate the gases. The gases then pass from the compressor through line 34 into cooler 36 where the temperature of the gases may be reduced, if necessary. The gases then pass through line 38 into line 12 where they are combined with the oxygen-containing gas entering through line 10 and then recycled back to the sieve bed vessel as described above.

In the above description the air required to regenerate the molecular sieves enters the system through line 10 while that necessary for oxidation of the CO and hydrocarbon combustibles is introduced into the afterburner through line 26. Optionally, the air required for both operations can be introduced at a single location, such as, through line 26.

When air is the oxygen-containing gas employed to practice my invention it should be introduced into the afterburner at a rate which will supply a 1 to 300 percent stoichiometric excess of oxygen, although a 10 to 20 percent excess is to be preferred. Temperatures in the afterburner should be maintained in the range of 700 to 1050° F. and the space velocity of the gases passing through the afterburner should be between 10 and 2000 v./v./hr. (standard cubic feet of gas/cubic feet of afterburner volume/hour) with a range of 20 to 100 v./v./hr. being preferred. When the optional inert gas stripping proceeds the regeneration it should be conducted at 750 to 950° F., or preferably at 850 to 900° F., to obtain the proper degree of cracking of the carbonaceous matter to volatile hydrocarbons.

Although the process described above involves the use of an afterburner chamber to oxidize volatile material in the effluent gases during regeneration, this process may be advantageously adapted to the inert gas stripping operation which optionally precedes the regeneration. In this embodiment necessary piping and valving would permit the use of the afterburner chamber to oxidize combustibles in the inert gas stream leaving the bed in a manner similar to that described above in the regeneration process thus permitting the inert gas stream to be recycled. Cooler 36, heater 16 and gas drier 14 would be employed in similar fashion to permit the stripping gas to enter the sieve bed vessel at the desired temperature and moisture content.

The present invention is illustrated in detail by the following example.

A bed of so-called Type 5–A molecular sieves having a coated deposit of 6.35 pounds of deposit per 100 pounds of sieve is to be regenerated. In three test runs three separate beds are regenerated under conditions which demonstrate the prior art and the present invention. The general regeneration conditions are listed in Table I below:

TABLE I.—REGENERATION CONDITIONS

Quantity of molecular sieves in vessel, lbs., 50,000
Oxygen-containing regeneration gas, air
Recycle gas rate, s.c.f.h., 20,000

|  | Carbon on sieves, wt. percent of sieve | C/H wt. ratio in sieve deposit |
|---|---|---|
| After final desorption | 6.35 | 6.00 |
| After inert gas stripping | 1.27 | 9.78 |
| After regeneration | 0.23 | 100% C |

NOTE.—Maximum molecular sieve bed temperature during regeneration, °F., 950; maximum water vapor partial pressure in exit gases, p.s.i.a. 0.15.

In Run No. 1, in a fashion similar to the prior art, the regeneration is preceded by an inert gas stripping step but the afterburner is not used to oxidize the recycled gases. In Run No. 2 inert gas stripping is used and the oxidation of the recycled gases, which is the subject of this invention, is conducted in an afterburner. In Run No. 3 no inert gas stripping is utilized but the regeneration gases are recycled through an afterburner where they are oxidized to illustrate a variation of the present invention.

The results of the three runs are set forth in Table II below. The stream numbers refer to the line designations used in the drawing.

It is seen from the above that when the process of this invention is incorporated with conventional regeneration techniques, substantial reduction in processing time is achieved. For example, inert gas stripping preceding the regeneration results in a saving of 23 hours in the regeneration cycle. Further, where no inert gas stripping is utilized but the recycled gases are oxidized, there is a reduction of 15 hours compared to the prior art technique of inert gas stripping with no oxidation of the recycled gases. Actually, in this latter case, the saving is 15 hours less than the prior art method plus the time required for the high temperature stripping step which is in excess of 15 hours. The overall saving is therefore in excess of 30 hours.

Although the preferred embodiments have been described, modifications and variations may be made without departing from the spirit and scope thereof. Only such limitations shall be imposed as are indicated in the claims set forth below.

I claim:

1. In a selective adsorption separation process of the type wherein hydrocarbons are separated by contacting mixtures of hydrocarbons with crystalline aluminosilicates and the selectively adsorbed hydrocarbons are desorbed in a subsequent desorption step and wherein following a series of adsorption-desorption cycles the crystalline aluminosilicates are periodically regenerated to substantially their initial adsorptive activity by the controlled oxidative removal of carbonaceous material therefrom in a regeneration zone wherein substantially all the exit gases leaving the regeneration zone are recycled to the regeneration zone, the improvement in the regeneration which comprises:

passing the exit gases in contact with (1) a solution selected from the group consisting of beta-naphthol and cuprous chloride-ammonia solution and (2) a fixed bed of an absorbent selected from the group consisting of silica gel and type 5A crystalline aluminosilicates under absorption conditions removing substantially all the oxidizable constituents from the exit gases.

2. In a selective adsorption separation process of the type wherein hydrocarbons are separated by contacting mixtures of hydrocarbons with crystalline aluminosilicates and the selectively adsorbed hydrocarbons are desorbed in a subsequent desorption step and wherein fol-

TABLE II.—REGENERATION DATA

|  |  | Run Number | | |
|---|---|---|---|---|
|  |  | 1 | 2 | 3 |
| Inert gas stripping | | Yes | Yes | (1) |
| Oxidation of recycled gases | | (1) | Yes | Yes |
| Regeneration time, hrs | | 2 124 | 1 101 | 109 |

| Stream number | Description | Gas rates, s.c.f.h. | | |
|---|---|---|---|---|
| 38 | Recycle gas | 20,000 | 20,000 | 20,000 |
| 10 | Air | 900 | 1,000 | 1,000 |
| 12 | Regeneration gas | 20,000 | 21,000 | 21,000 |
| 22 | Effluent gas | 20,800 | 20,900 | 21,000 |
| 26 | Afterburner air | | 100 | 1,000 |
| 30 | Bleed gas | 800 | 1,000 | 2,000 |

| | | Gas analysis, vol. percent | | | | | |
|---|---|---|---|---|---|---|---|
| | Run Number | $O_2$ | CO | $CO_2$ | $N_2$ | $CH_4$ | $C_2H_6$ |
| 38 | 1 | | 0.2 | 6.0 | 93.8 | | |
|  | 2 | | | 6.2 | 93.8 | | |
|  | 3 | | | 6.2 | 93.8 | | |
| 10 | 1, 2, 3 | 21.0 | | | 79.0 | | |
| 12 | 1 | 0.9 | 0.2 | 6.0 | 92.9 | | |
|  | 2 | 1.0 | | 6.2 | 92.8 | | |
|  | 3 | 1.0 | | 6.2 | 92.8 | | |
| 22 | 1 | | 0.2 | 6.7 | 93.1 | | |
|  | 2 | | 0.2 | 6.7 | 93.1 | | |
|  | 3 | | 0.2 | 6.7 | 92.7 | 0.3 | 0.1 |
| 26 | 1 | | | | | | |
|  | 2 | 21.0 | | | 79.0 | | |
|  | 3 | 21.0 | | | 79.0 | | |
| 30 | 1 | | 0.2 | 6.7 | 93.1 | | |
|  | 2 | | | 6.9 | 93.1 | | |
|  | 3 | | | 7.1 | 92.9 | | |

1 No.
2 Does not include time for inert gas stripping which requires about 15 hours plus time for heating and cooling the sieve bed.

lowing a series of adsorption-desorption cycles the crystalline aluminosilicates are periodically regenerated to substantially their initial adsorptive activity in a regeneration zone by the controlled oxidative removal of carbonaceous material therefrom which includes (a) an inert gas stripping step at 750 to 950° F. to crack the carbonaceous materials to volatile $C_1$ to $C_2$ hydrocarbons leaving a carbonaceous residue and (b) an oxidation step to remove the residue and wherein substantially all the exit gases leaving the regeneration zone during steps (a) and (b) contain oxidizable constituents and are recycled to the regeneration zone, the improvement in steps (a) and (b) which comprises:

passing the exit gases in contact with (1) a solution selected from the group consisting of beta-naphthol and cuprous chloride-ammonia solution and (2) a fixed bed of an absorbent selected from the group consisting of silica gel and type 5A crystalline aluminosilicates under absorption conditions removing substantially all the oxidizable constituents from the exit gases.

References Cited
UNITED STATES PATENTS

| | | | |
|---|---|---|---|
| 1,196,101 | 8/1916 | Gaus | 32—2 |
| 2,275,184 | 3/1942 | Mekler | 252—419 |
| 2,391,327 | 12/1945 | Mekler | 252—419 |
| 2,849,082 | 8/1958 | Giammarco | 55—68 |
| 3,364,136 | 1/1968 | Chen et al. | 252—416 X |
| 3,375,204 | 3/1968 | Hoke | 252—419 |
| 3,398,506 | 7/1968 | Baldus | 55—68 |

DANIEL E. WYMAN, Primary Examiner

P. E. KONOPKA, Assistant Examiner

U.S. Cl. X.R.

23—2 R; 55—68; 252—419